United States Patent [19]

Dassler

[11] 3,825,782
[45] July 23, 1974

[54] INDUCTIVE GENERATOR
[75] Inventor: Alfred Dassler, Konstanz, Germany
[73] Assignee: Licentia Patent Verwaltungs-G.m.b.H., Frankfurt, Germany
[22] Filed: Dec. 29, 1972
[21] Appl. No.: 319,800

[52] U.S. Cl. .............................. 310/168, 310/268
[51] Int. Cl. ....................................... H02k 19/20
[58] Field of Search ........... 310/168, 268, 169, 170, 310/155

[56] References Cited
UNITED STATES PATENTS
2,805,677   9/1957   Baird ............................ 310/168 X
2,820,915   1/1958   Mathews ........................... 310/168
3,509,390   4/1970   Loughlin et al ................ 310/168 X Primary Examiner—D. F. Duggan
Attorney, Agent, or Firm—Spencer & Kaye

[57] ABSTRACT

An inductive, frequency generator having first teeth-like protrusions provided in at least one of two first annular regions of a magnetically excited stator one of the first annular regions being divided into at least two arcuate portions. Further substantially identically shaped teeth-like protrusions are provided in at least one of two further annular regions of a rotor. The rotor and stator are positioned close to one another with their respective annular regions and teeth-like protrusions opposed to define two air gaps and constitute at least two distinct magnetic circuits. First and second partial windings are respectively positioned about portions of the respective magnetic circuits and are connected for additively summing induced useful voltages produced by magnetic flux changes resulting from rotation of the rotor. The magnetic circuits are excited by steady magnetic fields oppositely directed with respect to the orientations of the partial windings. Voltages produced by interfering magnetic fields are substantially reduced or cancelled, while the useful voltages are additively summed.

12 Claims, 10 Drawing Figures 3,825,782
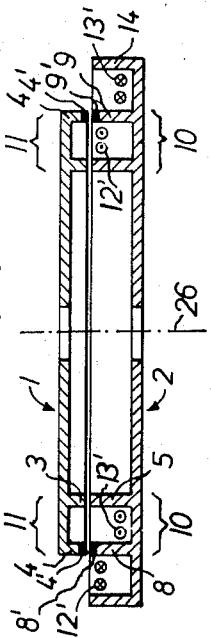
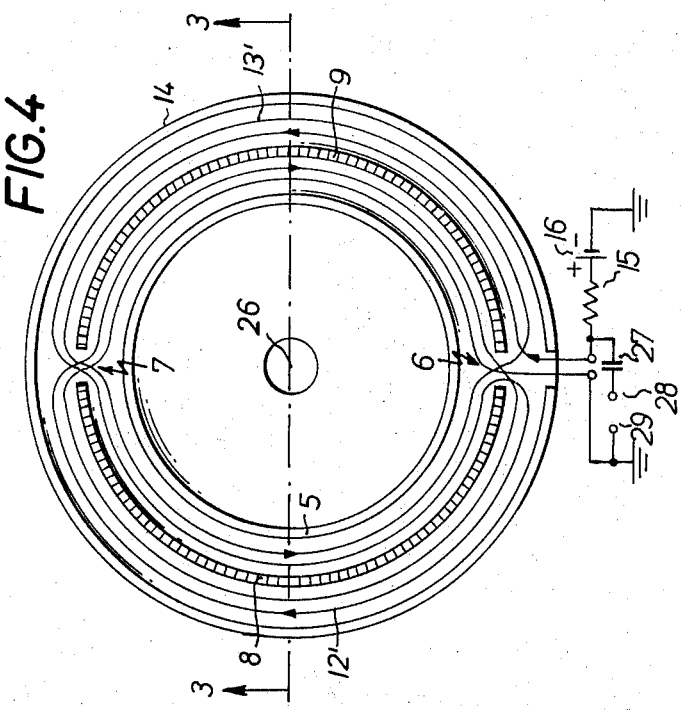
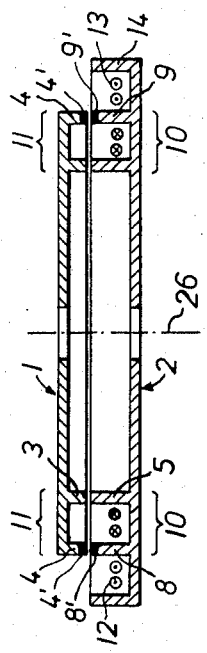
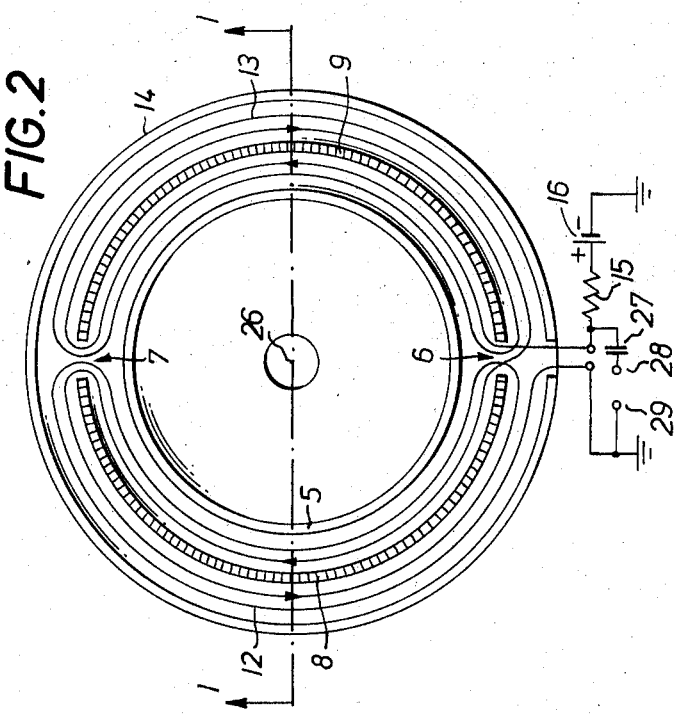

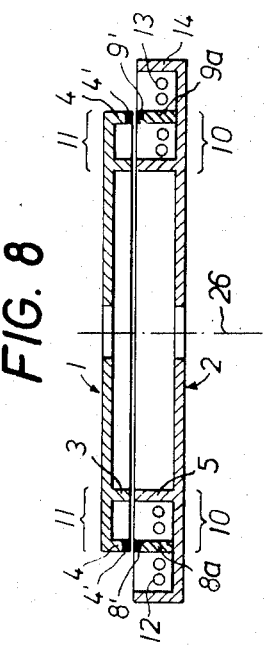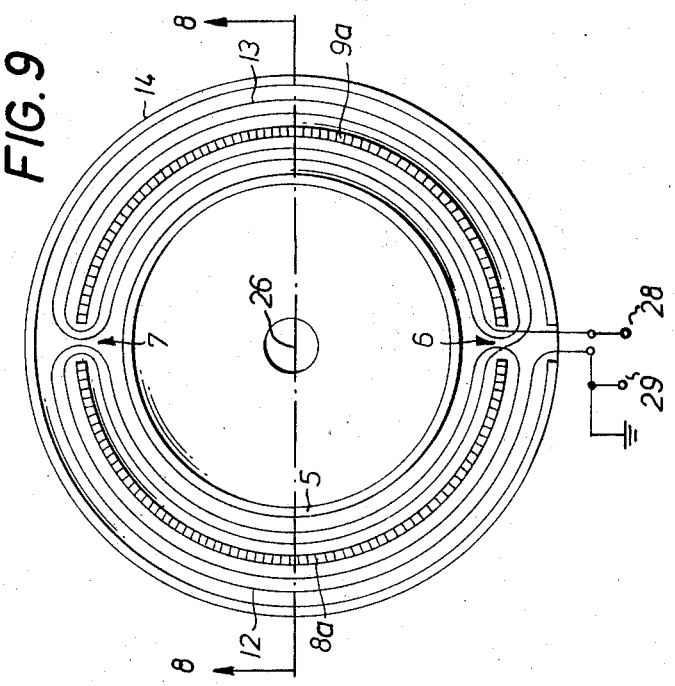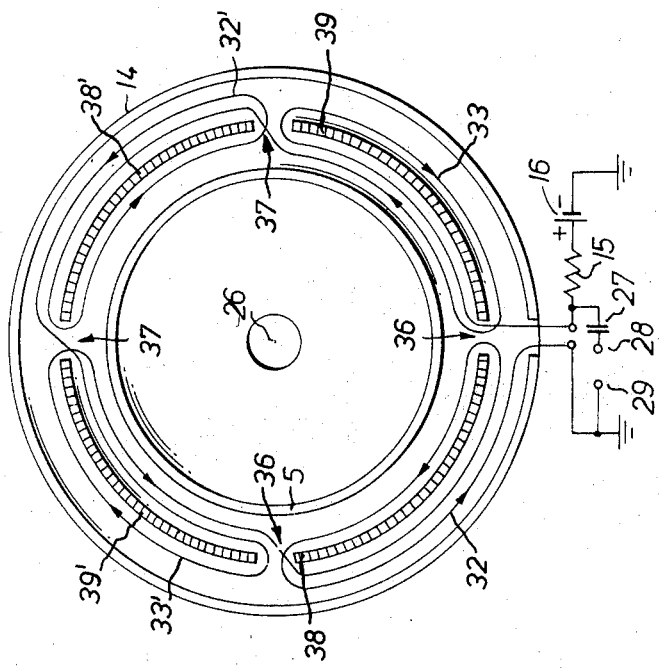
FIG. 8
FIG. 9
FIG. 10

INDUCTIVE GENERATOR

BACKGROUND OF THE INVENTION

The present invention relates to an inductive, frequency generator and, more particularly, to such a generator having a magnetically excited stator containing an induction coil and a rotor. The rotor forms air gaps with the stator between two respective annular regions of the stator and the rotor. The stator and the rotor each being provided with substantially identical teeth in at least one of their respective annular regions for effecting a periodic change in the magnetic flux to correspond with the number of revolutions of the rotor.

In known frequency generators of this type the stator closes a single magnetic circuit and the induction coil is a single coil disposed between cylinderical arms of the magnetic circuit. The excitation of the magnetic circuit is effected either by a direct current flowing through the induction coil itself or through a special excitation coil, or by a permanent magnetic field. Due to the periodic change in the reluctance of the magnetic circuit, and thus in the magnetic flux upon the mutual displacement of the stator and the rotor teeth, a useful voltage is produced in the single coil, the frequency (repetition rate) of this useful voltage being proportional to the number of revolutions of the rotor.

If sources of electromagnetic interference are disposed in the vicinity of such an inductive, frequency generator, as for example a.c. motors, transformers, oscillators and the like, additional interfering voltages are induced in the single coil of the frequency generator. These interfering voltages are super-imposed on the useful voltage and may even have magnitudes greater than the magnitude of the useful voltage. In addition to this superposition there occurs, in effect, an amplitude modulation of the useful voltage with the interfering voltage. The super-imposition as well as the amplitude modulation impart a frequency modulation to the output voltage when the combined signal is processed further in a subsequently connected Schmitt trigger circuit or the like. Thus even if the rotor rotates at a fixed velocity there occurs a frequency modulated output voltage although its frequency should be proportional to the number of revolutions of the rotor, i.e., constant. The frequency modulation of the useful voltage produced in this manner has an interfering effect on any control or regulating circuit to which the useful voltage of the frequency generator is fed as a rated speed signal. A sufficient magnetic shielding of the frequency generator or of the sources of interference, if it could be effective at all, is very complicated, cumbersome and expensive. This also applies to other countermeasures as, for example, the use of filters which can be successfully used only under limited circumstances and conditions.

SUMMARY OF THE INVENTION

It is an object of the present invention to provide an inductive, frequency generator whose output signal contains at most only a few components of interfering voltages even if there is an influence from interfering electromagnetic fields.

It is another object of the present invention to provide an inductive, frequency generator which does not require extensive magnetic shielding and whose output signal contains at most only a few components of interfering voltages.

It is a further object of the present invention to provide an inductive, frequency generator whose output signal contains at most only a few components of interfering voltage without the aid of filters.

The foregoing objects are achieved in accordance with the present invention by providing an inductive, frequency generator with a magnetically excited stator and a rotor. The stator has at least two first annular regions near its periphery, first teeth-like protrusions being provided in at least one of these regions. One of the first annular regions is subdivided into at least two arcuate portions. The rotor has at least two further annular regions near its periphery, with further teeth-like protrusions which are substantially identical to those on the stator being provided in at least a portion of this region. The stator and rotor are positioned in close proximity with the first annular regions opposite the further annular regions and with the first teeth-like protrusions opposite the further teeth-like protrusions to define the air gaps therebetween and constitute at least two distinct magnetic circuits in the vicinity of their peripheries. An induction coil arrangement is provided within the rotor. The coil arrangement includes first and second partial windings positioned respectively about a portion of respective ones of the magnetic circuits. The partial windings are connected together for additively summing induced useful voltages produced upon the occurrence of periodic change in the magnetic flux resulting from rotation of the rotor. Means are provided for exciting the magnetic circuits with steady magnetic fields oppositely directed with respect to the orientations of the partial windings. Thus, voltages produced in the partial windings by interfering magnetic fields are substantially reduced or cancelled while the useful voltages in these windings are additively summed.

BRIEF DESCRIPTION OF THE DRAWINGS

FIG. 1 is a simplified, axial, sectional view, taken along section line 1—1 in FIG. 2, of a first embodiment of a frequency generator according to the present invention.

FIG. 2 is a plan view of the stator of the generator shown in FIG. 1, the rotor being removed to show details of the stator and partial windings.

FIG. 3 is a simplified, axial, sectional view, taken along section line 3—3 in FIG. 4, of a second embodiment of a frequency generator according to the present invention.

FIG. 4 is a plan view of the stator of the generator shown in FIG. 3, the rotor being removed to show details of the stator and partial windings.

FIG. 8 is a simplified, axial, sectional view, taken along section line 8—8 in FIG. 9, of a fourth embodiment of a frequency generator according to the present invention.

FIG. 9 is a plan view of the stator of the generator shown in FIG. 8, the rotor being removed to show details of the stator and partial windings.

FIG. 10 is a plan view of the stator of a modification of the first embodiment of a frequency generator according to the present invention as shown in FIGS. 1 and 2, the rotor being removed to show details of the stator and partial windings.

DESCRIPTION OF THE PREFERRED EMBODIMENTS

Figure 5:
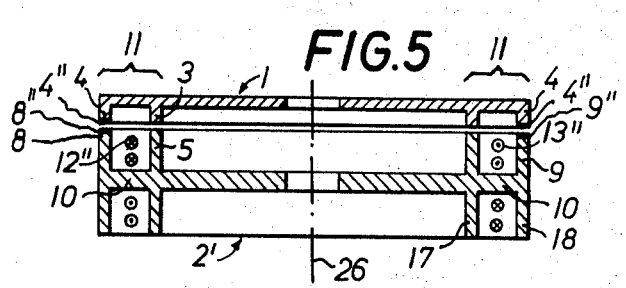
FIG. 5 is a simplified, axial, sectional view, taken along section line 5—5 in FIG. 6, of a third embodiment of a frequency generator according to the present invention.

As illustrated in FIGS. 1 and 2, an illustrative embodiment of an inductive generator according to the present invention includes a rotor 1 and a stator 2 made of soft magnetic material. The rotor 1 and the stator 2 are mounted, using conventional techniques, in close proximity to one another about an axis 26, the rotor 1 being rotatable about the axis 26. The conventional members used to mount the rotor 1 and the stator 2 are not shown in FIGS. 1 and 2 in order to illustrate more clearly the present invention. Two annular regions of the rotor 2 include respectively an annular or cylindrical, inner arm 3 and an outer arm 4 which as shown is at the periphery. The inner arm 3 is positioned opposite a likewise annular or cylindrical, inner arm 5 within the stator 2, the arm 5 being part of a first further annular region. An outer arm (unnumbered), which originally was cylindrical, of the stator 2 is positioned opposite the outer arm 4 and is subdivided into two arcuate arm portions 8 and 9 which are separated by two recesses 6 and 7. The outer arm which is subdivided into the arcuate portions 8 and 9 form part of a second further annular region. The recesses 6 and 7 are offset by 180° with respect to one another. Air gaps are formed between the arms 3 and 5 as well as between the arm 4 and each of the arcuate portions 8 and 9 of the rotor 1 and the stator 2. Thus, the arcuate arm portions 8 and 9 in association with the arm 5 and an annular zone 10, which connects the arm 5 to the arcuate arm portions 8 and 9 define stator portions of two distinct magnetic circuits.

The cylindrical arm 4 of the rotor 1 and the arcuate portions 8 and 9 of the stator 2 are provided with substantially identically shaped, associated teeth-like projections 4', 8' and 9' respectively. The annular arms 3, 4, 5 and the divided arm which forms the arcuate portions 8 and 9 extend parallel to the axis 26 of the generator.

Thus two distinct magnetic circuits distributed over the periphery of the stator are formed in the generator; each of these circuits includes portions of the annular zone 10 of the stator 2 and an annular zone 11 of the rotor 1. The first magnetic circuit (left) includes elements 5-10-8 of the stator 2 and elements 4-11-3 of the rotor 1. The second magnetic circuit (right) includes elements 5-10-9 of the stator 2 and elements 4-11-3 of the rotor 1. Other parts of the stator 1 and the rotor 2, which perform only mechanical functions, may be made of nonmagnetic material, it only being necessary that those portions of the generator which form the magnetic circuits be made of magnetic material.

The two arcuate arm portions 8 and 9 of the stator 2 bear respectively partial windings 12 and 13. The configurations of the respective partial windings 12 and 13 are adapted to the shape of the respective arcuate portions 8 and 9. As illustrated, the partial windings 12 and 13 are each composed of two-turn coils. The inner sections of these partial windings 12 and 13 are disposed respectively in a first chamber formed between the cylindrical arm 5 and the respective arcuate portions 8 and 9 of the stator 2. A second annular chamber is formed within the stator 2 by a peripheral, cylindrical arm or jacket 14 to accommodate and protect the outer sections of the partial windings 12 and 13. The two partial windings 12 and 13 of the induction coil within the stator 2 also serve as the excitation coils for the two above-described magnetic circuits with which they are respectively associated. The partial windings 12 and 13 each have one end connected to a current source 16, via a resistor 15, and are connected in series with one another with such a polarity that the excitation for the above-mentioned two magnetic circuits, shown respectively on the left and right of FIG. 1, have opposite directions, as indicated by the arrows associated with the partial windings 12 and 13 as shown in FIG. 2 and by the conventional dots and crosses, which indicate current direction, within parts of the partial windings 12 and 13, as shown in FIG. 1.

Thus, the magnetic flux in the two magnetic circuits has such a direction that at the top of the arcuate portion 8, as viewed in FIG. 1, a north (N) pole appears and at the top of the arcuate portion 9, as viewed in FIG. 1, a south (S) pole appears. The following mode of operation results:

A periodic change in the reluctance, produced during rotation of the rotor 1 about the axis 26, due to the above-mentioned teeth 4' and 8' as well as 4' and 9' produces identical-phase changes in magnetic flux to occur within the two above-described magnetic circuits containing respectively arcuate portions or arms 8 and 9. The useful voltages thus induced in the partial windings 12 and 13 and appearing via a capacitor 27 between terminals 28 and 29 are effectively summed additively because of the interconnection of these differently wound partial windings.

With respect to an interfering field, however, the two magnetic circuits act differently. Let it be assumed that the field lines of such an interfering field extend in the axial direction and are directed, at the moment under consideration, from the bottom to the top of the generator as shown in FIG. 1. Then the total magnetic flux in arcuate portion 8, which flux includes that produced by the direct current excitation which is also directed upwardly, is increased. In the arcuate portion 9, however, the total magnetic flux, which includes a downwardly directed component produced by direct current excitation, is reduced by substantially the same amount. The interfering voltages thus induced in the two partial windings 12 and 13 are of opposite phase so that when the voltages induced in the two partial windings are arithmetically summed, they substantially cancel one another.

The embodiment of an inductive generator according to the present invention as illustrated in FIGS. 3 and 4 differs from that shown in FIGS. 1 and 2 by the arrangement of the two partial windings, shown as partial windings 12' and 13'. The partial windings 12' and 13' are so designed that each one of the partial windings 12' and 13' is positioned respectively about the associated respective one of the arcuate portions 8 and 9. The remaining parts not yet mentioned, of the generator shown in FIGS. 3 and 4 correspond to those identified by corresponding reference numerals in FIGS. 1 and 2. Since the function and structural nature of these numeraled parts are essentially identical in both embodiments so far considered, it is not necessary to again consider them in detail.

Figure 6:
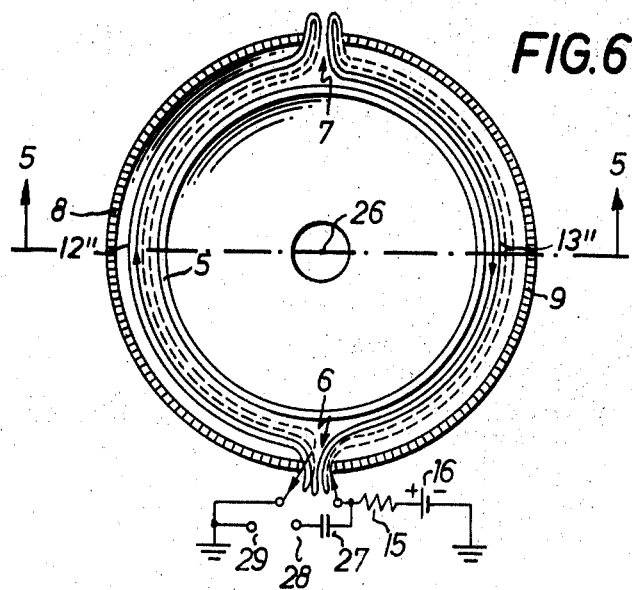
FIG. 6 is a plan view of the stator of the generator shown in FIG. 5, the rotor having been removed to show details of the stator and partial windings.

In the generator shown in FIGS. 1 and 2, as well as the generator illustrated in FIGS. 3 and 4, those arms of the magnetic circuit which are enclosed by partial windings 12 and 13 or 12' and 13', respectively, extend parallel to the axis 26 of the generator. This is not the case in the further embodiment of a generator according to the present invention illustated in FIGS. 5 and 6. As shown in FIGS. 5 and 6, partial windings 12'' and 13'' enclose arms of the magnetic circuits which extend radially between the arcuate portions 8 and 9 and which are formed by the annular zone 10 of a stator 2'. In order to accommodate and protect the sections of the partial windings 12'' and 13'' disposed on the underside of the stator 2', the stator 2' is supplemented by two cylindrical arms or jackets 17 and 18 which form a further annular chamber.

As shown in FIGS. 4 and 6, the direct current from the current source 16 produces oppositely directed magnetic fluxes in the two (left and right) magnetic circuits, as is clear from the arrowheads associated respectively with the partial windings 12' and 13' (FIG. 4) and the partial windings 12'' and 13'' (FIG. 5). The current directions within individual parts of the partial windings 12' and 13' are indicated conventionally by dots and crosses in FIG. 3. Similarly, the current directions within individual parts of the partial windings 12'' and 13'' are also indicated by dots and crosses in FIG. 5.

As in the embodiment of the generator of FIGS. 1 and 2, interfering magnetic fluxes which cut the partial windings 12' and 13' (FIGS. 3 and 4) and the partial windings 12'' and 13'' (FIGS. 5 and 6) have the same direction. Thus, the induced voltages from the partial windings 12' and 13' or 12'' and 13'' caused by interfering magnetic fields may be arithmetically summed so as to cancel, either completely or substantially completely while the useful voltages produced as a result of rotor rotation are arithmetically summed in an additive sense.

Those parts, not yet mentioned, of the generator illustrated in FIGS. 5 and 6 bearing reference numerals corresponding to those used in FIGS. 1 and 2 denote corresponding parts, and need not be again discussed in detail.

Inasmuch as the position of the frequency generator, with respect to an interfering electromagnetic field or with respect to the resultant of a plurality of interfering fields, is such that substantially the same size interfering voltages are generated in both partial windings, an arithmetical summation of the induced voltages will result in a substantially complete cancellation of the interfering voltages. The optimum position of the stator can be determined, for a given environment, by rotating the stator about the rotor axis until the sum of the two opposite-phase partial interfering voltages becomes zero or reaches a minimum.

A minimum in the interfering voltage can be obtained even if the partial interfering voltages generated in the two partial windings have different amplitudes. The two partial windings of the stator, e.g., the windings 12 and 13, are then, in a further preferred embodiment of the present invention, not directly connected in series but rather to a network in which settable components of the voltages induced in the partial windings can be summed. A simple embodiment of such a circuit arrangement is shown in FIG. 7.

Figure 7:
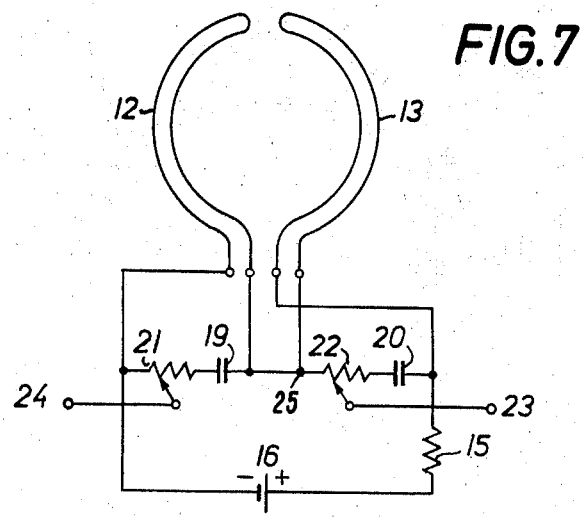
FIG. 7 is a schematic circuit of two partial windings of a frequency generator according to the present invention connected to a network for summing settable components of the induced voltages.

The circuit arrangement shown in FIG. 7 includes individually settable potentiometers 21 and 22. Each of the potentiometers 21 and 22 is provided with a settable tap and has a resistance substantially higher than the resistance of the individual partial windings 12 and 13. The partial windings 12 and 13 are connected respectively in parallel with a respective one of the potentiometers 21 and 22 via respective capacitors 19 and 20. The voltages appearing between the terminal 25 and the taps of the potentiometers 21 and 22 are connected in series. To attain a minimum of interference the taps on the two potentiometers 21 and 22 are first brought to their maximum (outmost) position. Then that one of the potentiometers 21, 22 which is associated with that one of the partial windings 12, 13 in which the greater partial interfering voltage is induced is set towards its minimum position until the sum of the opposite phase partial interfering voltages from the two partial windings 12 and 13 becomes zero or reaches a minimum at output terminals 23 and 24.

Instead of two magnetic circuits, the frequency generator of the present invention could include two groups of magnetic circuits which would be distributed over the periphery of the stator. In this case, a circuit of the first group may be followed by a circuit of the second group. The partial windings associated with the circuits of the two groups may be connected in series within each group. The further interconnections would be effected in the same sense as in the embodiments of the invention illustrated in FIGS. 1 – 6 of the drawings.

In order to illustrate such groups of magnetic circuits, FIG. 10 shows a stator of a frequency generator which is a modification of the stator of the embodiment according to FIGS. 1 and 2.

In the modified stator of FIG. 10 the first annular region which is subdivided is subdivided into a first group of arcuate portions 38 and 38' and a second group of arcuate portions 39 and 39'. These portions are separated by recesses 36, 36', 37 and 37' as illustrated.

In this way two groups of magnetic circuits are constituted, each group comprising two magnetic circuits containing respectively portions 38 and 38' and portions 39 and 39'.

Arcuate portions 38 and 38' bear respectively windings 32 and 32' which together constitute a first partial winding and arcuate portions 39 and 39' bear respectively windings 33 and 33' which together constitute a second partial winding. Windings 32 and 33 each have one end connected to elements 15, 16, 27, 28 and 29 as described above for windings 12 and 13 in FIG. 2, and all windings 33, 32', 33' and 32 are connected together in series with one another with such a polarity that the excitations for the first group of magnetic circuits containing arcuate portions 38 and 38' and for the second group of magnetic circuits containing arcuate portions 39 and 39' have opposite directions as indicated by the arrows associated with the windings 33, 32', 33' and 32.

Thus the flux in the four magnetic circuits has such a direction that, as viewed in FIG. 1, at the tops of arcuate portions 38 and 38' a north (N) pole appears and at the tops of arcuate portions 39 and 39' a south (S)

pole appears. The resulting mode of operation therefore is quite similar to that explained above for the embodiment according to FIGS. 1 and 2.

Whereas, in the embodiments of frequency generators as described so far, excitation of the magnetic circuits of the stator is accomplished electromagnetically, by means of a direct current flowing through respective windings, it is further possible according to the present invention to use permanent magnet means for this purpose as shown in FIGS. 8 and 9.

The embodiment of a frequency generator illustrated in FIGS. 8 and 9 differs from the embodiment of FIGS. 1 and 2 essentially in that it has arcuate portions 8a and 9a which are made from permanent-magnetic material and that no battery 16 is used.

The arcuate portions 8a and 9a are magnetized in such a direction that, as viewed in FIG. 8, at the top of arcuate portion 8a a north (N) pole appears and at the top of the arcuate portion 9 a south (S) pole appears. Therefore the resulting mode of operation equals that of the generator illustrated in FIGS. 1 and 2.

It will be understood that the above description of the present invention is susceptible to various modifications, changes and adaptations, and the same are intended to be comprehended within the meaning and range of equivalents of the appended claims.

I claim:

1. An inductive, frequency generator comprising, in combination:
    a. magnetically excited stator means having at least two first annular regions near its periphery, first teeth-like protrusions being provided in at least one of said first annular regions, one of said first annular regions being subdivided into at least two arcuate portions distributed over the periphery of said stator means;
    b. rotor means having at least two further annular regions near its periphery, further teeth-like protrusions which are substantially identically shaped to those on said stator being provided in at least one of said further annular regions, said rotor means being positioned in close proximity to said stator means with said at least two first annular regions opposite said at least two further annular regions and with said first teeth-like protrusions opposite said further teeth-like protrusions to define air gaps therebetween and constitute at least two distinct magnetic circuits in the vicinity of said peripheries;
    c. induction coil means within said stator means including:
        1. a first partial winding positioned about a portion of one of said magnetic circuits,
        2. a second partial winding positioned about a portion of another of said magnetic circuits, and
        3. means connecting said partial windings together for additively summing induced useful voltages produced upon the occurrence of periodic change in the magnetic flux resulting from rotation of said rotor means; and
    d. means for exciting said magnetic circuits with steady magnetic fields oppositely directed with respect to the orientations of said partial windings; whereby voltages produced in the partial windings by interfering magnetic fields are substantially reduced or cancelled while the useful voltages produced in the partial windings are additively summed.

2. A frequency generator as defined in claim 1 wherein said first annular regions include respective arms which extend substantially parallel to the axis of the generator and wherein said portions of said magnetic circuits about which said partial windings are positioned are said respective arms.

3. A generator as defined in claim 2 wherein said one of said first annular regions which has been subdivided includes two separate arcuate arm portions separated by two recesses, with each of said arcuate arm portions extending substantially parallel to the axis of the generator, and wherein the other of said first annular regions includes an annular arm extending substantially parallel to the axis of the generator.

4. A generator as defined in claim 3, wherein said recesses are offset with respect to one another by 180°.

5. A generator as defined in claim 3, wherein each of said arcuate arm portions bears a respective one of said partial windings, said partial windings being adapted respectively to the shape of respective said arcuate arm portions.

6. A generator as defined in claim 3, wherein said annular arm is an inner arm of said stator means and wherein said arcuate arm portions comprise a divided outer annular arm, each one of said partial windings being positioned partially about each of said arcuate arm portions, and enclosing said annular inner arm.

7. A generator as defined in claim 1, wherein said portions of said magnetic circuits about which said partial windings are positioned are respective arms of said magnetic circuits, which respective arms extend radially from the axis of the generator.

8. A generator as defined in claim 1, wherein said means for exciting said magnetic circuits includes an excitation coil constituted by said partial windings.

9. A generator as defined in claim 1, wherein said means for exciting said magnetic circuits includes an induction coil.

10. A generator as defined in claim 1, wherein said means for exciting said magnetic circuits comprises permanent magnet means.

11. A generator as defined in claim 1, further comprising a summing network having at least one settable circuit component, input means and output means; and wherein said partial windings are connected to said input means of said network, whereby weighted components of the voltages induced in said partial windings by an interfering electromagnetic field are asymmetrically added in said summing network and the sum of the interfering voltages at said output means becomes zero.

12. A generator as defined in claim 1, wherein that one of said first annular regions which is subdivided is subdivided into a first group of arcuate portions and a second group of arcuate portions distributed near the periphery of said stator means, the disposition of said stator means with respect to said rotor means defining air gaps therebetween and constituting a first group of magnetic circuits and a second group of magnetic circuits in the vicinity of said peripheries; wherein said first partial winding is positioned about individual portions of said first group of magnetic circuits and said second partial winding is positioned about individual portions of said second group of magnetic circuits; and wherein said means for exciting said magnetic circuits excite said first group and said second group of magnetic circuits with steady state magnetic fields oppositely directed with respect to the orientations of said partial windings about each respective said magnetic circuit.

* * * * *

UNITED STATES PATENT OFFICE
CERTIFICATE OF CORRECTION

Patent No. 3,825,782     Dated July 23rd, 1974

Inventor(s) Alfred Dassler

It is certified that error appears in the above-identified patent and that said Letters Patent are hereby corrected as shown below:

In the heading of the patent, after line 7, insert

--Foreign Application Priority Data
Dec. 28, 1971, Germany .................... P 21 65 087.3 -- .

Signed and sealed this 22nd day of October 1974.

(SEAL)
Attest:

McCOY M. GIBSON JR.
Attesting Officer

C. MARSHALL DANN
Commissioner of Patents